Figure 1:
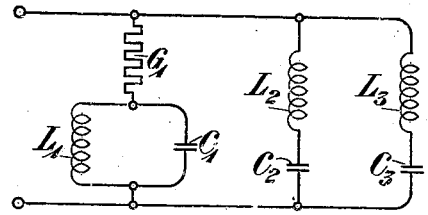

R. S. HOYT.
ARTIFICIAL LINE.
APPLICATION FILED JULY 9, 1919.

1,437,422.

Patented Dec. 5, 1922.

INVENTOR
R. S. Hoyt
BY
ATTORNEY

Patented Dec. 5, 1922.

1,437,422

UNITED STATES PATENT OFFICE.

RAY S. HOYT, OF BROOKLYN, NEW YORK, ASSIGNOR TO AMERICAN TELEPHONE AND TELEGRAPH COMPANY, A CORPORATION OF NEW YORK.

ARTIFICIAL LINE.

Application filed July 9, 1919. Serial No. 309,633.

*To all whom it may concern:*

Be it known that I, RAY S. HOYT, residing at Brooklyn, in the county of Kings and State of New York, have invented certain Improvements in Artificial Lines, of which the following is a specification.

My invention relates to an artificial line for simulating the impedance of a periodically loaded line over a preassigned range of frequencies, as, for example, the range of frequencies necessary for the telephonic transmission of speech. In the following specification I disclose an embodiment of my invention consisting of an artificial line designed to simulate a geographically extended loaded transmission line. The accompanying drawings relate to this example of my invention, but it will be understood that the invention is defined in the appended claims.

The basic form of the artificial line of my present disclosure, though possessing properties closely analogous to those of the basic form of the artificial line of my previous disclosure, covered by U. S. Patent No. 1,167,693, dated January 11, 1916, is nevertheless entirely distinct therefrom and independent thereof. Not only is it entirely different in form, but it is also different in function, in that it simulates the line impedance at an entirely different point within the loaded line, namely at a certain point in a loading coil, which point is herein designated a basic position, instead of at a point in a loading section.

Of course, in actual practice, geographical lines do not generally terminate at what I have designated a basic position. The actual termination of a line may, in fact, be a full loading section (distance between load coils) or any fractional part thereof, depending upon geographical factors, or it may be a full loading coil or any fractional part thereof, according as convenience dictates. However, like the basic artificial line disclosed in my aforesaid patent, the basic artificial line of my present invention admits of being extended so as to simulate the impedance of a loaded line terminating at any other position than the basic position. For a certain range of line terminations my present artificial line is simpler and cheaper than my aforesaid previous artificial line, while for a certain other range the aforesaid previous artificial line is the simpler and the cheaper; but on the whole the two possess about equal utility.

The above-mentioned analogy between the basic form of my present invention and the basic form of my aforesaid previous invention consists in the fact that the mathematical expression for the admittance of my present basic artificial line is of the same form as the mathematical expression for the impedance of my aforesaid previous basic artificial line; while there is a similar correspondence between the mathematical expressions for the admittance and the impedance of the actual loaded lines simulated by these two basic artificial lines. Stated more specifically, my present basic artificial line simulates the admittance of a loaded line that terminates with a certain fractional loading coil, with the same precision as my aforesaid previous basic artificial line simulates the impedance of a loaded line that terminates with the corresponding fractional section. As will appear in detail below, extensive use is here made of this mathematical analogy in the deduction and presentation of the properties of the artificial line constituting my present invention. However, this is done merely for the sake of simplicity and to save labor; it not being essential, as of course the properties of the network constituting my present invention could be deduced and presented from either an impedance viewpoint or an admittance viewpoint quite independently of my previous invention.

Figure 2:
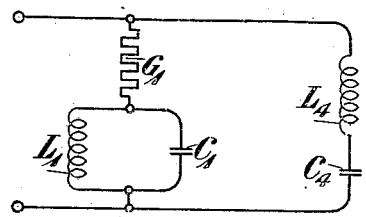
Figure 3:
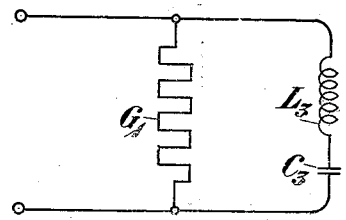
Figure 6:
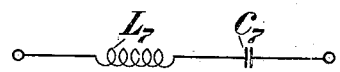
Figure 4:
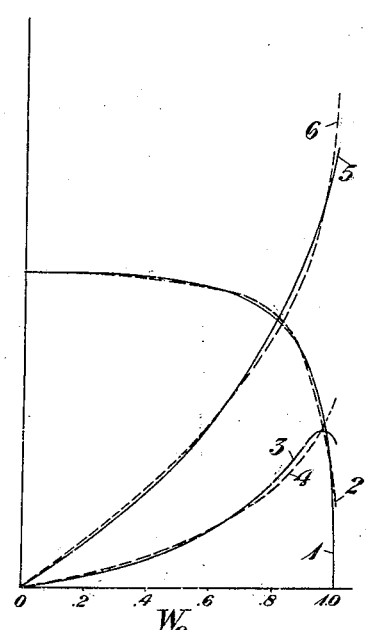
Figure 5:
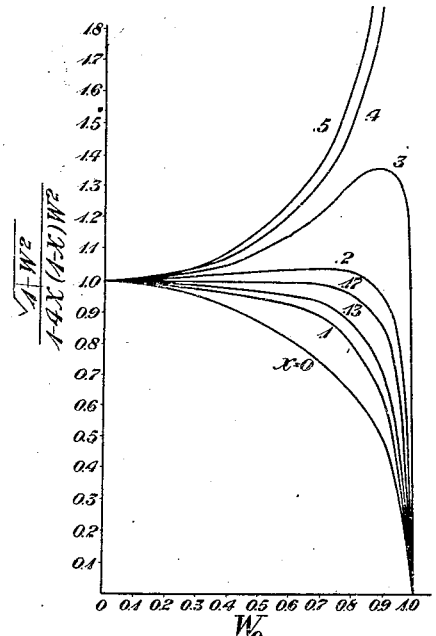

In the accompanying drawings, Figure 1 illustrates diagrammatically a basic form of artificial line arranged in accordance with my present invention; Fig. 2 shows a modification of the invention providing what may conveniently be termed a consolidated form; Fig. 3 shows another modification of the invention, providing a still simpler though somewhat less precise form; Fig. 4 presents a series of curves showing the simulative precision of my invention, as embodied in Fig. 1; Fig. 5 presents a series of curves showing the applicability of the invention; and Fig. 6 illustrates a supplementary structure for taking into account the effect of line wire resistance and load coil resistance.

Preliminary to the development of the general theory underlying this invention it may be remarked that the term "characteristic mid-load impedance" is commonly used to denote the characteristic impedance of a periodically loaded line which begins with a half-coil; that is, a coil whose inductance is half the inductance of each of the succeeding coils. In what follows, it will be convenient to employ, in addition, the more general term "characteristic $x$-load impedance" to denote the characteristic impedance of a loaded line which begins at a load; that is, with a coil whose inductance bears the ratio $x$ to the inductance of each of the succeeding coils.

The general theory underlying this invention will now be developed. Such theory can be based more simply and more conveniently on a general formula for the characteristic $x$-load admittance of a periodically loaded line than on the corresponding formula for its reciprocal, the characteristic $x$-load impedance. For any fixed frequency and initial termination, said admittance, as is well known, depends mainly on the line capacity and on the load coil inductance; but also, to a slight extent, on the distributed line-inductance. This small effect produced by the distributed line inductance will not be neglected, but will be taken into account in the same manner as has already been fully set forth in my previous Patent No. 1,167,693, wherein it is shown that, as regards characteristic mid-load impedance (and hence as regards characteristic mid-load admittance), a periodically loaded line having distributed line inductance in addition to its lumped load coil inductance is simulated to a high degree of precision by a certain periodically loaded line having no distributed line inductance but having an inductance $L_o$ per load coil and a capacity $sC_o$ per loading section where $s$ is the spacing of the load coils, that is, the distance between adjacent coils, and $L_o$ and $C_o$ are approximately equal to the corresponding constants of the actual loaded line, that is, to its inductance L per load coil and to its capacity C per unit length, respectively; said constants being related in accordance with equations (15) and (16) of my aforesaid Patent No. 1,167,693.

With the effect produced by the distributed inductance thus taken account of, the general theory underlying this invention may be based on the relatively simple formula for the characteristic $x$-load admittance of the aforesaid $L_oC_o$ equivalent loaded line having no distributed inductance. Such formula, which will next be developed, will be based, in turn, on the formula for the characteristic mid-load impedance as already given in my previous Patent No. 1,167,693.

In what follows, the characteristic mid-load impedance of a periodically loaded line will be denoted by H, and the characteristic $x$-load impedance by $H_x$. Clearly the values of $H_x$ and H for the $L_oC_o$ loaded line are related as expressed by the equation $$H_x = H - ipL_o/2 + ipxL_o \quad \text{(1)}$$

where $i$ designates the imaginary operator $\sqrt{-1}$ and $p$ denotes $2\pi$ times the frequency $f$. Equation (1) can be readily proved from the fact that $ipL_o/2$ is the impedance of a half-load coil and $ipxL_o$ is the impedance of an $x$-load coil, so that the difference $ipxL_o - ipL_o/2$ is the amount by which the impedance of an $x$-load coil exceeds the impedance of a half-load coil and hence is the amount by which the characteristic impedance $H_x$ of a loaded line which begins at $x$-load exceeds the characteristic impedance H of a loaded line which begins at mid-load. But from equation (14) of my aforesaid Patent No. 1,167,693 the value of H is, very closely, $$H = \sqrt{L_o/sC_o} \sqrt{1-w_o^2} \quad \text{(2)}$$

where $$w_o = p\sqrt{sC_oL_o}/4 = f/f_c \quad \text{(3)}$$

and $f_c$ denotes the critical frequency, $$f_c = 1/\pi\sqrt{sC_oL_o} \quad \text{(4)}$$

so-named because at this particular frequency a sudden change occurs in the line properties (propagation constant and impedance) and in its immediate neighborhood those properties vary rapidly with frequency. Efficient transmission is inherently limited to the frequency range below the critical frequency, that is, to values of $w_o$ less than unity; the transmission efficiency being very poor at higher frequencies, that is, at values of $w_o$ greater than unity. Therefore the frequency range of practical importance for transmission purposes is that lying below the critical frequency; and the corresponding range of $w_o$ is that lying below unity.

Substituting in (1) the value $$p = 2w_o\sqrt{sC_oL_o}$$

obtainable from (3) and (4) and denoting the quantity $\sqrt{sC_o/L_o}$ by $T_o$, we find that $$H_x = H - i(1-2x)w_o/T_o \quad \text{(5)}$$

Denoting by Z the characteristic $x$-load admittance, which is the reciprocal of the characteristic $x$-load impedance $H_x$, we find from (5) that $$Z = \frac{T_o\sqrt{1-w_o^2} + iT_o w_o(1-2x)}{1-4x(1-x)w_o^2} \quad \text{----(6)}$$

This will be written for convenience as $$Z = D + iQ \quad \text{----------(7)}$$

where D and Q are respectively the real and the imaginary parts of the right-hand side of equation (6); D thus being the characteristic $x$-load conductance of the $L_o C_o$ loaded line, and Q the characteristic $x$-load susceptance thereof.

Equations (2) and (5) express the characteristic impedance of a loaded line having no resistance in the line wires and in the loading coils. The effect of the actual resistance in modifying the characteristic impedance has been fully set forth in my previous Patent No. 1,167,693, wherein such effect is shown to be small; and wherein, moreover, it is shown how to take account of said effect in those cases for which said effect is not entirely negligible. As pointed out later herein, the effect of the actual resistance of the line wires and the coils in modifying the characteristic admittance can be similarly taken account of, when desired; but further discussion of this feature will be deferred for the present, as the effect in question is not only small and comparatively unimportant, but is also of such a nature as to admit of being represented independently (by an added term) and taken account of independently (by an added branch).

Returning now to equation (6) for the characteristic $x$-load admittance, and comparing same with equation (19) for the characteristic $x$-section impedance as given in my aforesaid Patent No. 1,167,693, it will be observed that these two equations are exactly alike (although, to be sure, the constants $x$ and $T_o$ do not have the same meanings in both). In other words, the characteristic $x$-load admittance and the characteristic $x$-section impedance are exactly the same functions of the independent variable $w_o$ (although the parameters $x$ and $T_o$ involved do not have the same meanings in the two expressions. This identity in the form of the two expressions (which constitutes the mathematical analogy mentioned above) enables extensive use to be made here of the mathematical developments given in my aforesaid Patent No. 1,167,693, as will appear more in detail below.

The circuit arrangement which simulates the admittance expressed by formula (6) (for a particular value of $x$ specified later herein) is represented by Fig. 1. It is in the nature of a basic structure, and is the part termed, above, the basic artificial line. The portion consisting of the capacity $C_3$ in series with the inductance $L_3$ simulates the susceptance component Q of Z as given by equations (6) and (7). Referring to said equations it will be seen that the imaginary or susceptance component may be written $$Q = \frac{psC_o(1-2x)/2}{1-x(1-x)sC_o L_o p^2} \quad \text{-----(8)}$$

But the admittance of a capacity $C_3$ in series with an inductance $L_3$ is well known to be expressible as $$\frac{ipC_3}{1-C_3 L_3 p^2}$$

Comparison of this expression with the right-hand side of equation (8) shows that they are identical provided that $C_3$ and $L_3$ be given the following values $$C_3 = (1/2-x)sC_o \quad \text{---------(9)}$$

$$L_3 = \frac{x(1-x)L_o}{1/2-x} \quad \text{---------(10)}$$

It is thus seen that the $C_3 L_3$ portion of the basic structure simulates the susceptance component of the admittance of the $L_o C_o$ loaded line provided that $C_3$ and $L_3$ are proportioned in accordance with equations (9) and (10). Of course physical limitations restrict the choice of $x$ to those values for which $C_3$ and $L_3$ are positive, but that means only that $x$ cannot exceed 1/2, while it can have any value from 0 to 1/2.

Equations (6) and (7) show that the conductance component of the characteristic admittance of the $L_o C_o$ loaded line is given by $$D = \frac{T_o \sqrt{1-w_o^2}}{1-4x(1-x)w_o^2} \quad \text{------(11)}$$

A plot herewith (Fig. 5) of the coefficient of $T_o$ in this equation shows that said conductance component D has a drooping characteristic for values of $x$ less than 0.17, and finally becomes zero at $w_o = 1$. Now a conductance element, in series with the combination consisting of an inductance element and a capacity element in parallel with each other, will have a similar conductance characteristic provided that the inductance condenser portion is anti-resonant in the neighborhood of $w_o = 1$. The admittance of a conductance $G_1$, in series with the combination consisting of an inductance $L_1$ and condenser $C_1$ in parallel with each other, is well known to be $$1 - \frac{G_1(1-L_1 C_1 p^2)}{(1-L_1 C_1 p^2) + ipG_1 L_1} = A_1 + iB_1 \quad \text{--(12)}$$

Here $A_1$ and $B_1$ are, respectively, the real and imaginary components of the expression on the left-hand side of equation (12), and are therefore the conductance and susceptance components respectively of the admittance of said combination. If, in equation (12), the quantity $$\frac{w_o}{\sqrt{sC_oL_o/4}}$$

is substituted for its identity $p$, the values of $A_1$ and $B_1$ are:

$$A_1 = \frac{G_1(1 - 4\frac{L_1C_1}{sL_oC_o}w_o^2)^2}{(1 - 4\frac{L_1C_1}{sL_oC_o}w_o^2)^2 + 4\frac{G_1^2L_1^2}{sL_oC_o}w_o^2} \quad (13)$$

$$B_1 = \frac{-\left(\frac{2G_1^2L_1}{\sqrt{sL_oC_o}}\right)w_o\left(1 - 4\frac{L_1C_1}{sL_oC_o}w_o^2\right)}{(1 - 4\frac{L_1C_1}{sL_oC_o}w_o^2)^2 + 4\frac{G_1^2L_1^2}{sL_oC_o}w_o^2} \quad (14)$$

From analogy with the relations set forth in equations (33) and (34) of my aforesaid Patent No. 1,167,693, it is now clear that the conductance component of the characteristic $x$-load admittance of the $L_oC_o$ loaded line can be simulated over the range $w_o=0$ to $w_o=1$, by the conductance component $A_1$ of a network made up of a conductance element $G_1$, in series with the combination consisting of an inductance $L_1$ and a capacity $C_1$ in parallel with each other, by assigning the following values:

$$G_1 = \sqrt{\frac{sC_o}{L_o}} \quad\quad\quad (15)$$

$$C_1 = (2.023)sC_o \quad\quad (16)$$

$$L_1 = (.1069)L_o \quad\quad (17)$$

$$X = 0.14 \quad\quad\quad (18)$$

Equations (15), (16), (17) thus constitute the design-formulæ in accordance with which I proportion the $G_1C_1L_1$ portion of the artificial line.

Fig. 4 serves to show the high degree of precision with which the conductance component $A_1$ approximates the conductance component $D$ of the line admittance. In said Fig. 4, the curve 1 is a plot of the conductance component of the admittance of the $L_oC_o$ loaded line having an initial fractional coil of $0.14L_o$; while the curve 2 is a plot of the conductance component $A_1$ of the admittance of my artificial line; the abscissæ being the values of $w_o$.

The susceptance component $B_1$ must be neutralized since it does not usefully simulate any component of the line admittance. By analogy with the relations disclosed in my aforesaid Patent No. 1,167,693, it may be seen that this neutralization can be accomplished very closely by shunting the $G_1C_1L_1$ portion of the structure with a capacity of $C_2$ in series with an inductance $L_2$ provided that $$C_2 = (0.120)sC_o \quad\quad (19)$$

$$L_2 = (1.28)L_o \quad\quad\quad (20)$$

The precision with which the susceptance of the $L_2C_2$ portion neutralizes the susceptance of the $G_1C_1L_1$ portion is shown in Fig. 4, in which curve 3 is a plot of $-B_1$ and curve 4 is a plot of the susceptance of the $C_2L_2$ portion of Fig. 1, when $x$ is assigned the particular value 0.14. If $x=0.14$, the value hereinbefore assigned to it, equations (9) and (10) become $$C_3 = (0.3600)sC_o \quad\quad (21)$$

$$L_3 = (0.3344)L_o \quad\quad (22)$$

If, then, the elements of the structure shown in Fig. 1 are proportioned in accordance with equations (15)-(22) inclusive, the structure simulates very closely over the entire range of frequencies necessary for telephonic transmission of speech, the admittance of the $L_oC_o$ loaded line having an initial fractional coil equal to $0.14 L_o$. This is illustrated in Fig. 4, wherein the conductance simulation is shown by curves 1 and 2 already referred to; while the susceptance simulation is shown by curves 5 and 6, which are plots of the susceptance component of the $L_oC_o$ loaded line and of the susceptance component of the structure shown in Fig. 1, respectively.

It will be noted that the basic structure designed in accordance with the design formulæ (15)-(22) inclusive, simulates the characteristic admittance of the $L_oC_o$ loaded line having a particular initial fractional coil possessing an inductance equal to $0.14 L_o$, since the simulation is most precise for this particular fractional value of the initial coil $xL_o$. In general, of course, the line may have any coil as its initial coil (usually, however, either a whole coil or a half coil); or it may begin with a whole section or a fractional section instead of with a whole coil or a fractional coil. It therefore becomes necessary to supplement the basic structure to the end that it may simulate the admittance of a line having an initial coil or an initial section of any value. This may be accomplished, for example, by adding to the artificial line an extension so that the extended artificial line shall be equivalent to a line having whatever initial termination is contemplated. It will be understood that such extension may be proportioned in accordance with $L_o$ and $C_o$.

If it is desired to take into account the resistance effect as given by equation (27) of my aforesaid Patent No. 1,167,693, this may be accomplished exactly as indicated by equations (43) and (44) thereof; or, with slightly less precision, the resistance effect can be represented by merely a condenser $C_7$ and an inductance $L_7$ (Fig. 6) placed in series with the network, which condenser and inductance may be proportioned in accordance with the relation set forth in my previous Patent No. 1,167,694 just as though the line were uniformly loaded instead of periodically loaded, this assumption being permissible because the effect in question occurs mainly at small values of $w_0$.

A simplified form, which may conveniently be termed the consolidated artificial line, can be gotten from the basic structure, at a very small sacrifice of simulative precision, by combining the $C_2L_2$ and $C_3L_3$ portions into a single $C_4L_4$ portion, as shown in Fig. 2; and this constitutes a particular simplified embodiment of my invention. By analogy with my previous Patent No. 1,167,693, the most suitable values of $C_4$ and $L_4$ are given as follows:

$$C_4 = (0.483)sC_0 \quad \text{(23)}$$

$$L_4 = (0.265)L_0 \quad \text{(24)}$$

A still simpler form, represented by Fig. 3, can be gotten from the basic structure represented by Fig. 1, though at a somewhat greater sacrifice of simulative precision, by omitting altogether the $C_1L_1$ portion and the $C_2L_2$ portion, and at the same time adopting a somewhat different proportioning for the $C_3L_3$ portion; and this constitutes another simplified embodiment of my invention. The reason for adopting somewhat different proportioning of this form is the fact that the conductance component of the characteristic $x$-load admittance can be simulated by a mere constant conductance most accurately when $x$ is equal to about 0.2, since then the said conductance component is most nearly independent of $w_0$, as shown by Fig. 5. The best value for $G_1$ is still approximately that expressed by formula (15); and the best values for $C_3$ and $L_3$ are those expressed by formulæ (9) and (10) after inserting therein the particular value chosen for $x$ (approximately 0.2). Thus equations (15), (9), and (10) constitute the design-formulæ for the simplified network represented by Fig. 3.

This invention, as in the case of the inventions disclosed in my aforementioned Patent No. 1,167,693, finds its application where the impedance of a loaded line is to be simulated; as for instance, for balancing purposes in systems involving two two-way telephone repeaters; and in other transmission systems.

Suppose, for example, that it is desired to design an artificial line in accordance with my present invention, which shall simulate the characteristic impedance of the same periodically loaded line as referred to in the illustrative example worked out in my previous Patent No. 1,167,693; that is, an aerial line consisting of two parallel #8 B. W. G. copper wires, loaded at intervals of 8 miles ($s=8$), but beginning with a half-coil (instead of with a 0.14-section, as in the above-mentioned illustration); the distributed inductance, J, per mile of line is 0.0034 henries; the capacity, C, per mile is $0.0092 \times 10^{-6}$ farads; the total resistance per mile including load coil resistance is 5 ohms; and the induction per load coil is 0.240 henries.

Then, as already computed in my Patent No. 1,167,693, $L_0$ and $C_0$ have the values: $L_0=0.258$ henries, $C_0=0.0088\times10^{-6}$ farads.

The values of the elements constituting the basic structure (Fig. 1) for simulating the impedance of the $L_0C_0$ loaded line when beginning with a fractional coil of inductance $0.14\times0.258$ henries are then, by aid of the foregoing computations together with equations (15)–(22), found to be as follows: $R_1=1/G_1=1910$ ohms; $C_1=0.144\times10^{-6}$ farads; $L_1=0.0276$ henries; $C_2=0.00853\times10^{-6}$ farads; $L_2=0.330$ henries; $C_3=0.0256\times10^{-6}$ farads; $L_3=0.0863$ henries.

To simulate the characteristic mid-load impedance, as required, this basic structure must evidently be extended by means of a series inductance having a value equal to $(0.5-0.14)L_0$, that is, 0.0093 henries.

If particularly high simulative precision is desired, to take account of the effect produced by the wire resistance and the load-coil resistance of the given loaded line, this may be accomplished by connecting in series the supplementary part shown in Fig. 6, consisting of an inductance $L_7=0.00090$ henries, and a capacity $C_7=6.77\times10^{-6}$ farads.

If the consolidated form of network shown in Fig. 2 is desired, the constants $C_4$ and $L_4$ are determined by equations (23) and (24): $C_4=0.0344\times10^{-6}$ farads, and $L_4=0.0684$ henries.

If the still simpler form of network shown in Fig. 3 is desired, and if approximate simulation is required over as wide a range as possible rather than more precise simulation over a narrower range, then $x$ would be chosen as 0.2; whence, by (9) and (10), the constants $C_3$ and $L_3$ are: $C_3=0.0213\times10^{-6}$ farads, and $L_3=0.138$ henries. The value of $R_1=1/G_1$ is, by (15), $R_1=1910$ ohms.

Although I have shown and described herein only a few forms of artificial lines embodying my invention, it is readily understood that other changes and modifications may be made therein within the scope of the following claims without departing from the spirit and scope of my invention. Furthermore, although I have shown these forms of artificial lines as designed to simulate a geograpically extended loaded transmission line, it will readily be understood that according to the principle of my present invention, artificial lines may be made to simulate other examples of loaded lines.

What I claim is:

1. In an artificial line a network comprising a plurality of parallel paths, one of said paths comprising a resistance element and the other inductance and capacity reactance elements connected in series with each other, the values of said elements being such that the impedance of the network simulates that of a loaded line beginning at a point in a loading coil.

2. An artificial line simulating the characteristic admittance of a loaded line, said artificial line including means having an admittance whose conductance component simulates the conductance of the loaded line beginning at a point within a loading coil, and means for neutralizing the susceptance component of the admittance of said first named means.

3. An artificial line simulating the characteristic admittance of a loaded line, said artificial line comprising a pair of parallel paths, one including susceptance devices simulating the susceptance component of the admittance of the loaded line, the other including conductance and susceptance elements providing admittance having a conductance component simulating the conductance of the loaded line beginning at a point within a loading coil, and means for neutralizing the susceptance component of the admittance produced by said conductance and susceptance elements, whereby the joint admittance of said conductance and susceptance elements and of said neutralizing means has no susceptance component.

4. In an artificial line simulating the characteristic admittance of a loaded line beginning at a point within a loading coil the combination of means for simulating the susceptance component of said admittance, means composed of conductance and susceptance elements providing an admittance having a conductance component simulating the conductance component of the admittance of said loaded line beginning at a point within a loading coil and means for neutralizing the susceptance component of the admittance produced by said conductance and susceptance elements.

5. An artificial line simulating the characteristic admittance of a loaded line, said artificial line including the combination of a resistance element in series with an inductance element and a condenser connected in parallel with each other, said combination having an admittance whose conductance component simulates the conductance component of the admittance of the loaded line, and means for neutralizing the susceptance component of the admittance of said combination.

6. An artificial line simulating the characteristic admittance of a loaded line, said artificial line comprising a path containing a resistance, an inductance and a condenser simulating the conductance of the loaded line, and a second path in parallel to the first and containing an inductance and a condenser simulating the susceptance of the loaded line; said resistances, inductances and condensers having values depending on the load coil inductance, the distance between consecutive load coils, the capacity and inductance of said loaded line, and the distributed character of said line inductance.

7. An artificial line simulating the characteristic impedance of a loaded line, said artificial line having a portion containing a resistance element in series with inductance and capacity elements connected in parallel with each other, and a portion in parallel with said other portion and consisting of an inductance element in series with a capacity element; said resistance, inductance and capacity elements having values depending on the load coil inductance, the distance between consecutive load coils, the capacity and inductance of said line between loads and the distributed character of said line inductance.

8. An artificial line simulating the characteristic impedance of a loaded line, said artificial line comprising a portion containing a resistance element in series with an inductance coil and a condenser connected in parallel, said portion being connected as a whole in parallel with two other portions each consisting of an inductance coil in series with a condenser; the values of said resistance, inductance and capacity elements being determined by the load coil inductance, the distance between consecutive load coils, the capacity and inductance of said line between loads and the distributed character of said line inductance.

9. An artificial line simulating the characteristic impedance of a loaded line, said artificial line comprising a portion consisting of an inductance coil in series with a condenser, said portion simulating the effect of the line between loads and load coil resistance, a portion consisting of a resistance element in series with an inductance coil and condenser connected in parallel, and a portion consisting of an inductance coil in series with a condenser, the first of said portions being connected in series with the two last mentioned portions associated with each other in parallel relationship and the values of said resistance, inductance and capacity elements being determined by the load coil inductance and resistance, the distance between consecutive load coils, the resistance, capacity and inductance of said line and the distributed character of said line inductance.

10. An artificial line simulating the characteristic impedance of a loaded line, said artificial line comprising a portion consisting of an inductance coil in series with a condenser, said portion simulating the effect of the line and load coil resistance, a second portion consisting of a resistance element in series with an inductance coil and a condenser in parallel with each other, and two other portions each consisting of an inductance coil in series with a condenser, the last three of said four portions of said artificial line being connected in parallel with each other and the first portion thereof being connected in series with the said three portions, and the values of said resistance, inductance and capacity elements being determined by the load coil inductance and resistance, the distance between the consecutive load coils, the resistance, capacity and inductance of said line and the distributed character of said line inductance.

11. In an artificial line simulating the characteristic admittance of a line, a sub-combination simulating the conductance component of said admittance and comprising a portion consisting of a resistance element in series with an inductance coil and a condenser connected in parallel with each other, and a portion consisting of an inductance coil and a condenser in series; said portions being connected in parallel with each other, and said resistance, capacity and inductance elements having values depending on the load coil inductance, the distance between consecutive load coils, the capacity and inductance of said line between loads and the distributed character of said line inductance.

12. A network for simulating the impedance of a circuit comprising shunt capacity and lumped series inductances placed at substantially equal capacity intervals, said network comprising a plurality of parallel paths, impedance elements in said paths, the values of said elements being such that the conductance of one of said paths is substantially equal to the conductance component of the admittance of the circuit beginning with a fractional inductance coil and the susceptance of another of said paths is substantially equal to the susceptance component of the said admittance.

13. A network for simulating the impedance of a circuit comprising shunt capacity and lumped series inductances placed at substantially equal capacity intervals, said network comprising a plurality of parallel paths, one of said paths comprising inductance and capacity elements in series with each other approximately to simulate the susceptance component of the line as a whole and another of said paths comprising a resistance element in series with an inductance and capacity element connected in parallel with each other.

14. A network for simulating the impedance of a circuit comprising shunt capacity and lumped series inductances placed at substantially equal capacity intervals, said network comprising a plurality of parallel paths, two of said paths comprising inductance and capacity elements in series with each other one of said two paths approximately simulating the susceptance component of the line as a whole and another of said paths comprising a resistance element in series with an inductance and a capacity element connected in parallel with each other.

In testimony whereof, I have signed my name to this specification this 30 day of June 1919.

RAY S. HOYT.